United States Patent
Wen

(10) Patent No.: US 6,883,647 B1
(45) Date of Patent: Apr. 26, 2005

(54) HYDRAULIC BRAKE LEVER FOR A BICYCLE

(76) Inventor: Chun Te Wen, No. 1, Alley 16, Lane 40, Jiun Te Rd., Taichung (TW)

( * ) Notice: Subject to any disclaimer, the term of this patent is extended or adjusted under 35 U.S.C. 154(b) by 0 days.

(21) Appl. No.: 10/666,994

(22) Filed: Sep. 16, 2003

(51) Int. Cl.⁷ .............................................. B62L 3/00
(52) U.S. Cl. ..................... 188/24.22; 188/344; 74/18.2
(58) Field of Search ................. 188/24.15, 24.22, 188/344; 60/594; 74/18.2

(56) References Cited

U.S. PATENT DOCUMENTS

| | | | | |
|---|---|---|---|---|
| 3,935,930 A | * | 2/1976 | Kine | 188/344 |
| 4,175,648 A | * | 11/1979 | Sule | 188/344 |
| 5,813,501 A | * | 9/1998 | Terry, Sr. | 188/344 |
| 6,003,639 A | * | 12/1999 | Buckley et al. | 188/26 |
| 6,209,687 B1 | * | 4/2001 | Hundley | 188/24.16 |
| 6,318,514 B1 | * | 11/2001 | Hinkens et al. | 188/73.38 |
| 6,658,844 B1 | * | 12/2003 | Lammers | 60/585 |
| 6,739,133 B1 | * | 5/2004 | Barnett | 60/594 |
| 2003/0121739 A1 | * | 7/2003 | Lumpkin | 188/344 |

* cited by examiner

Primary Examiner—Robert A. Siconolfi
Assistant Examiner—Devon Kramer

(57) ABSTRACT

A hydraulic brake lever for a bicycle, comprising a main body, a pull handle, and an adjusting mechanism. Thus, the hydraulic brake lever can be operated conveniently and smoothly, thereby facilitating the rider operating the hydraulic brake lever. In addition, the hydraulic brake lever is sensitive, thereby protecting the rider's safety. Further, the operation stroke of the brake can be changed and adjusted conveniently, so as to adjust the sensitivity of the brake to the optimum state.

9 Claims, 6 Drawing Sheets

HYDRAULIC BRAKE LEVER FOR A BICYCLE

BACKGROUND OF THE INVENTION

1. Field of the Invention

The present invention relates to a hydraulic brake lever for a bicycle, and more particularly to a hydraulic brake lever for a bicycle, wherein the hydraulic brake lever can be operated conveniently and smoothly, thereby facilitating the rider operating the hydraulic brake lever.

2. Description of the Related Art

A conventional hydraulic brake lever for a bicycle has the following disadvantages.

1. The conventional hydraulic brake lever is not sensitive, so that it cannot be operated conveniently.

2. The conventional hydraulic brake lever cannot be operated smoothly under the emergency condition, thereby causing danger to the rider.

3. The tension of the conventional hydraulic brake lever cannot be adjusted easily and conveniently, thereby causing inconvenience to the rider.

SUMMARY OF THE INVENTION

The present invention is to mitigate and/or obviate the disadvantage of the conventional hydraulic brake lever for a bicycle.

The primary objective of the present invention is to provide a hydraulic brake lever for a bicycle, wherein the hydraulic brake lever can be operated conveniently and smoothly, thereby facilitating the rider operating the hydraulic brake lever.

Another objective of the present invention is to provide a hydraulic brake lever for a bicycle, wherein the hydraulic brake lever is sensitive, thereby protecting the rider's safety.

A further objective of the present invention is to provide a hydraulic brake lever for a bicycle, wherein the operation stroke of the brake can be changed and adjusted conveniently, so as to adjust the sensitivity of the brake to the optimum state.

In accordance with the present invention, there is provided a hydraulic brake lever for a bicycle, comprising a main body, a pull handle, and an adjusting mechanism, wherein:

the main body has an inside formed with a hydraulic oil tank, the main body has a bottom provided with a cylinder connected to the hydraulic oil tank, the main body includes a press rod slidably mounted in the cylinder;

the pull handle has a front end pivotally mounted on the main body; and the adjusting mechanism is mounted on the front end of the pull handle and includes an adjusting wheel rotatably mounted on the pull handle, a threaded rod screwed in the adjusting wheel, and an adjusting rod secured between a distal end of the threaded rod and a distal end of the press rod of the main body.

Further benefits and advantages of the present invention will become apparent after a careful reading of the detailed description with appropriate reference to the accompanying drawings.

DETAILED DESCRIPTION OF THE INVENTION

Figure 1:
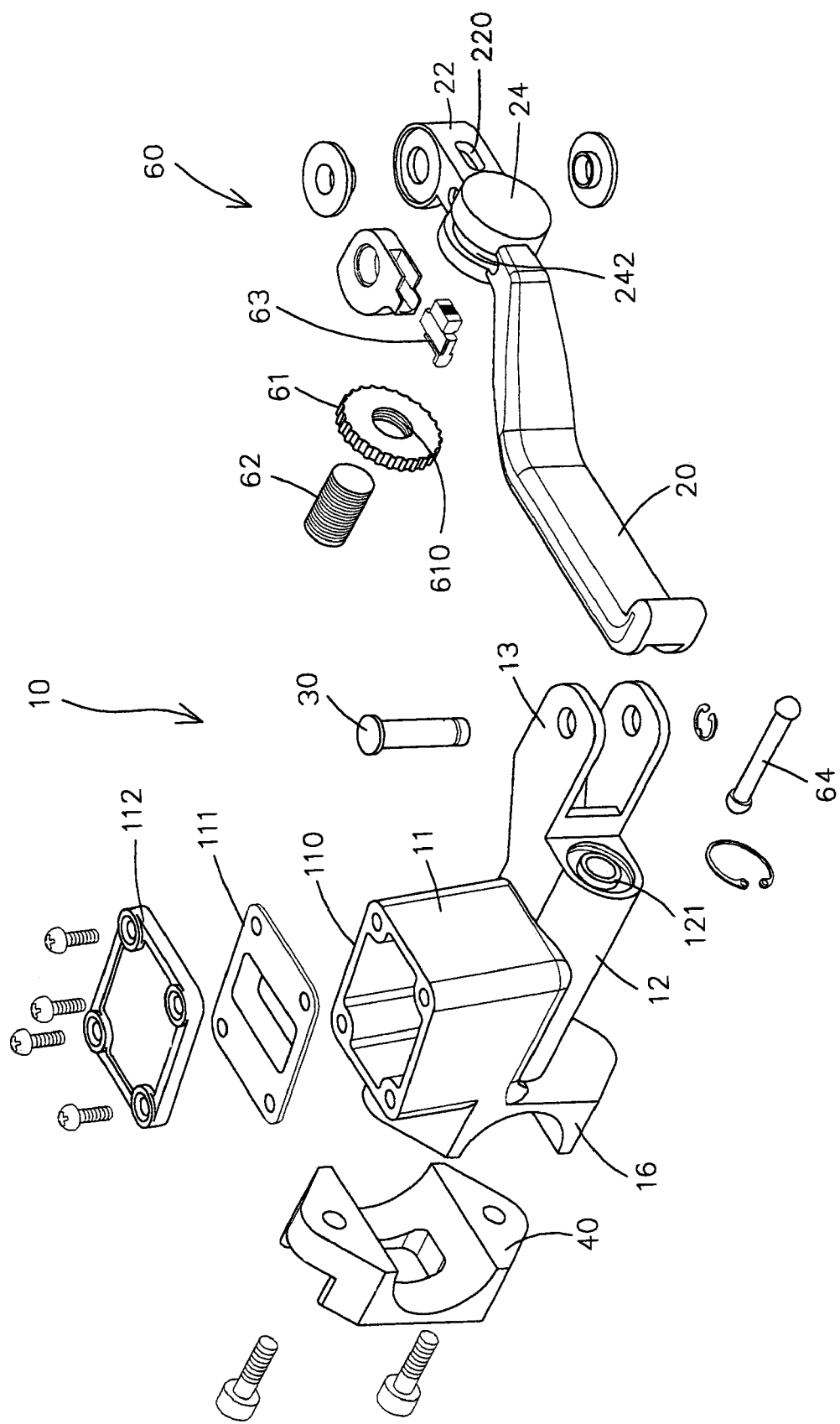
FIG. 1 is an exploded perspective assembly view of a hydraulic brake lever for a bicycle in accordance with the preferred embodiment of the present invention.
Figure 2:
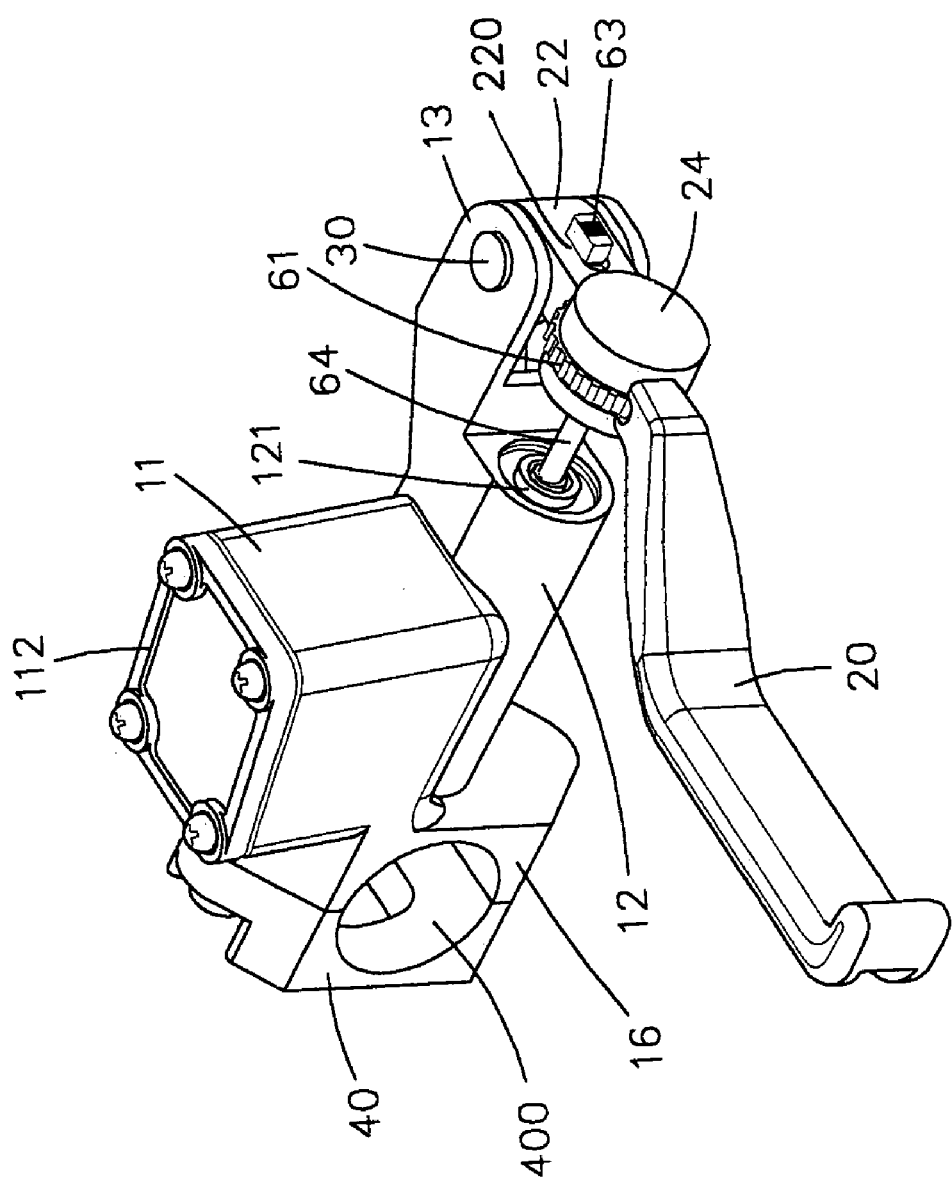
FIG. 2 is a perspective assembly view of the hydraulic brake lever for a bicycle in accordance with the preferred embodiment of the present invention.
Figure 3:
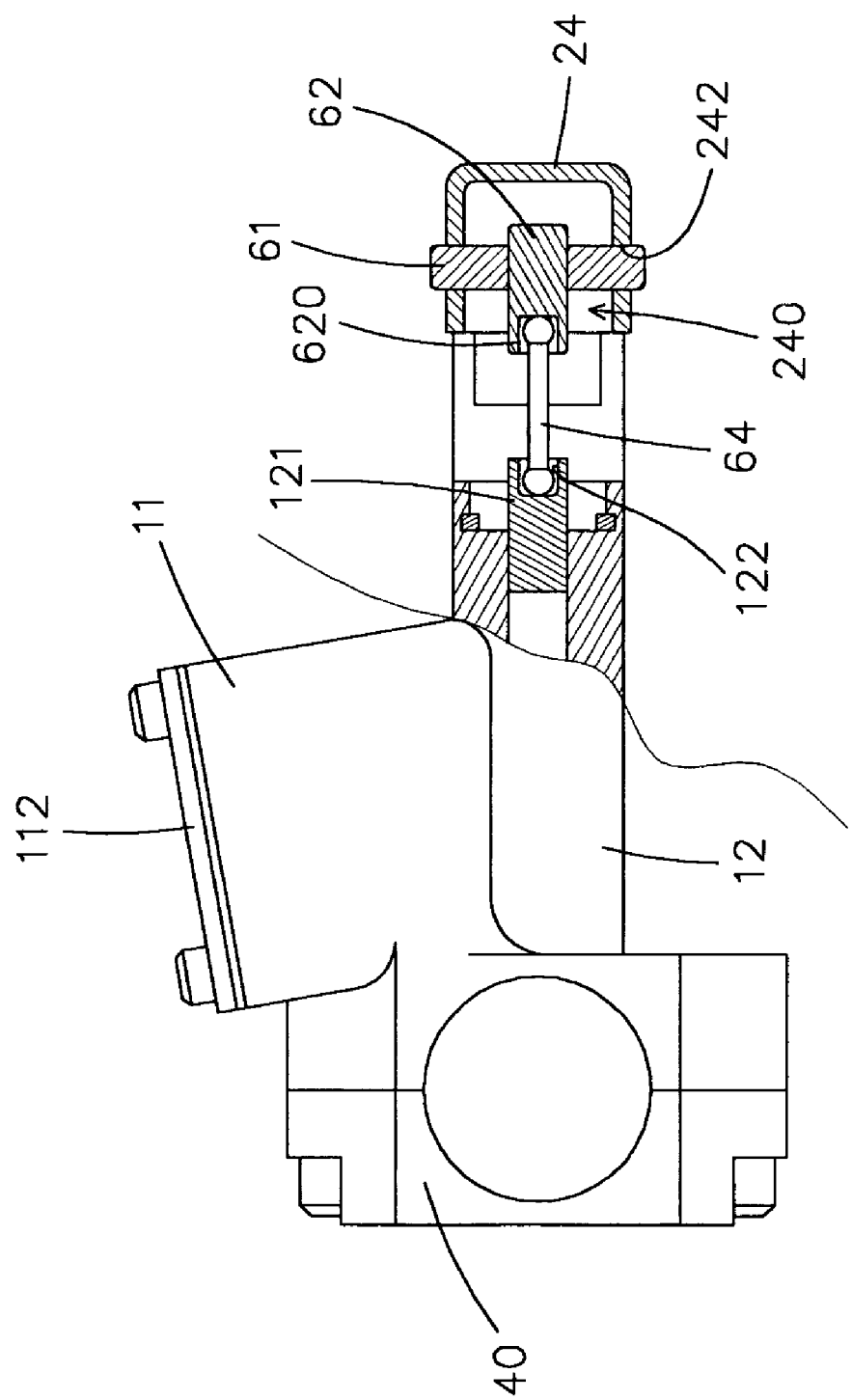
FIG. 3 is a partially cut-away side plan cross-sectional view of the hydraulic brake lever for a bicycle as shown in FIG. 2.
Figure 6:
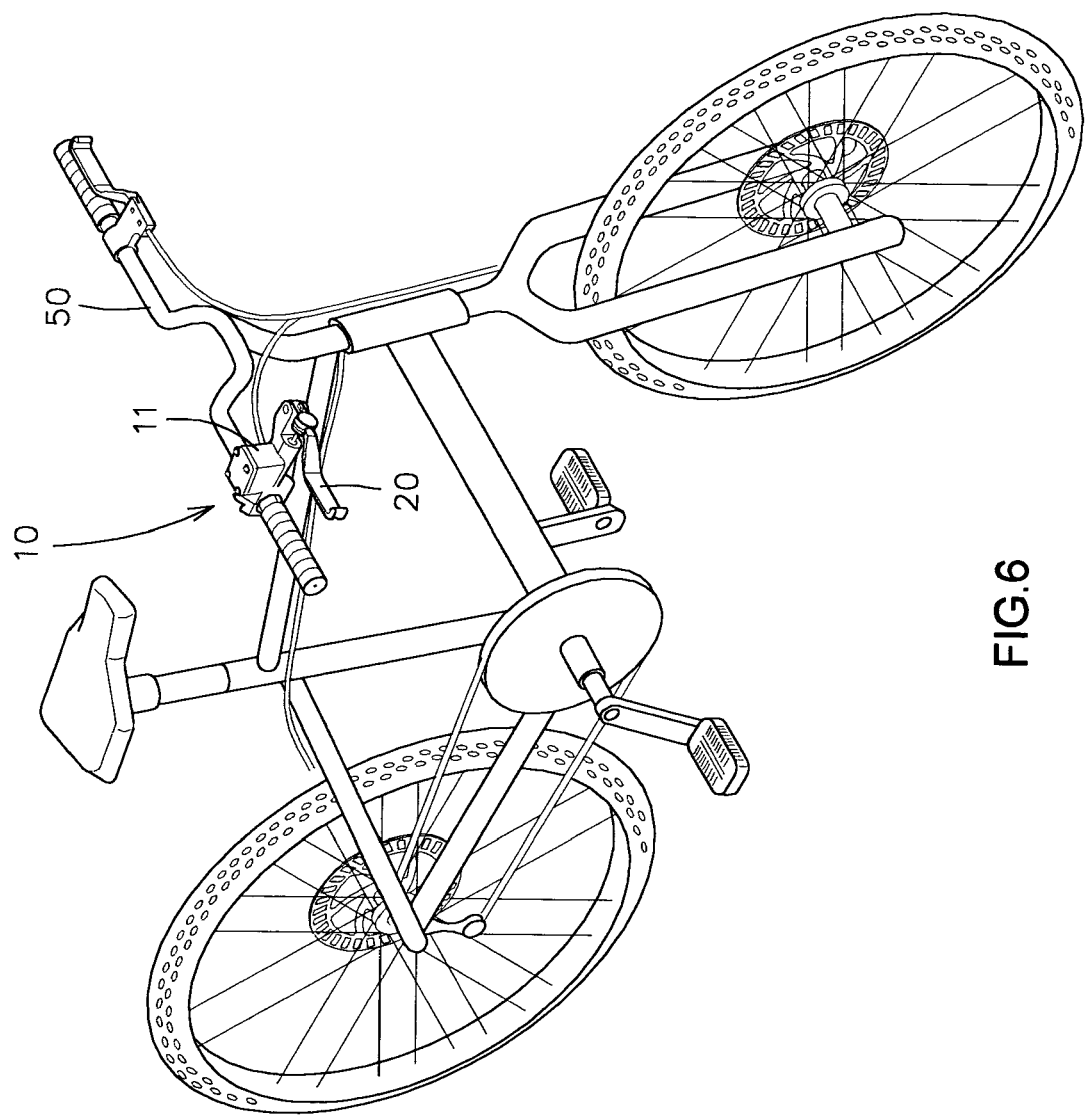
FIG. 6 is a schematic perspective view showing the hydraulic brake lever being mounted on the handlebar of the bicycle.

Referring to the drawings and initially to FIGS. 1–3, a hydraulic brake lever 10 for a bicycle in accordance with the preferred embodiment of the present invention is mounted on the handlebar 50 (see FIG. 6) of the bicycle and comprises a main body 11, a pull handle 20, and an adjusting mechanism 60.

The main body 11 has an irregular shape. The main body 11 has an inside formed with a hydraulic oil tank 110. The hydraulic brake lever 10 further comprises a cover 112 mounted on a top of the main body 11 to encompass the hydraulic oil tank 110 of the main body 11, and a leakproof washer 111 mounted between the cover 112 and the top of the main body 11 to provide an air seal effect. The main body 11 has a bottom provided with a cylinder 12 connected to the hydraulic oil tank 110. The main body 11 includes a press rod 121 slidably mounted in the cylinder 12. The main body 11 has a side provided with a semi-circular clamping block 16. In addition, the cylinder 12 is provided with a protruding pivot base 13.

The hydraulic brake lever 10 further comprises a semi-circular clamping body 40 combined with the clamping block 16 of the main body 11, thereby defining a circular receiving hole 400 between the clamping body 40 and the clamping block 16 of the main body 11 for mounting the handlebar 50 (see FIG. 6) of the bicycle.

The pull handle 20 is pivotally mounted on the main body 11. The pull handle 20 has a front end 22 pivotally mounted on the pivot base 13 of the main body 11 by a pivot shaft 30. The front end 22 of the pull handle 20 is provided with a cylindrical receiving seat 24 having an inside formed with a receiving chamber 240 and having a peripheral wall formed with a receiving groove 242 communicating with the receiving chamber 240. In addition, the front end 22 of the pull handle 20 is formed with an oblong slide slot 220.

The adjusting mechanism 60 is mounted on the pull handle 20. The adjusting mechanism 60 includes an adjusting wheel 61 rotatably mounted in the receiving groove 242 of the receiving seat 24 of the pull handle 20, a threaded rod 62 movably mounted in the receiving chamber 240 of the receiving seat 24 of the pull handle 20 and screwed in the adjusting wheel 61, and an adjusting rod 64 secured between a distal end of the threaded rod 62 and a distal end of the press rod 121 of the main body 11. The adjusting wheel 61 is formed with a screw bore 610 screwed on the threaded rod 62. The distal end of the threaded rod 62 is formed with a positioning hole 620 for securing a first end of the adjusting rod 64, and the distal end of the press rod 121 of the main body 11 is formed with a positioning hole 122 for securing a second end of the adjusting rod 64.

The adjusting mechanism 60 further includes a locking block 63 slidably mounted in the slide slot 220 of the front end 22 of the pull handle 20 to lock the adjusting wheel 61 after adjustment.

Figure 4:
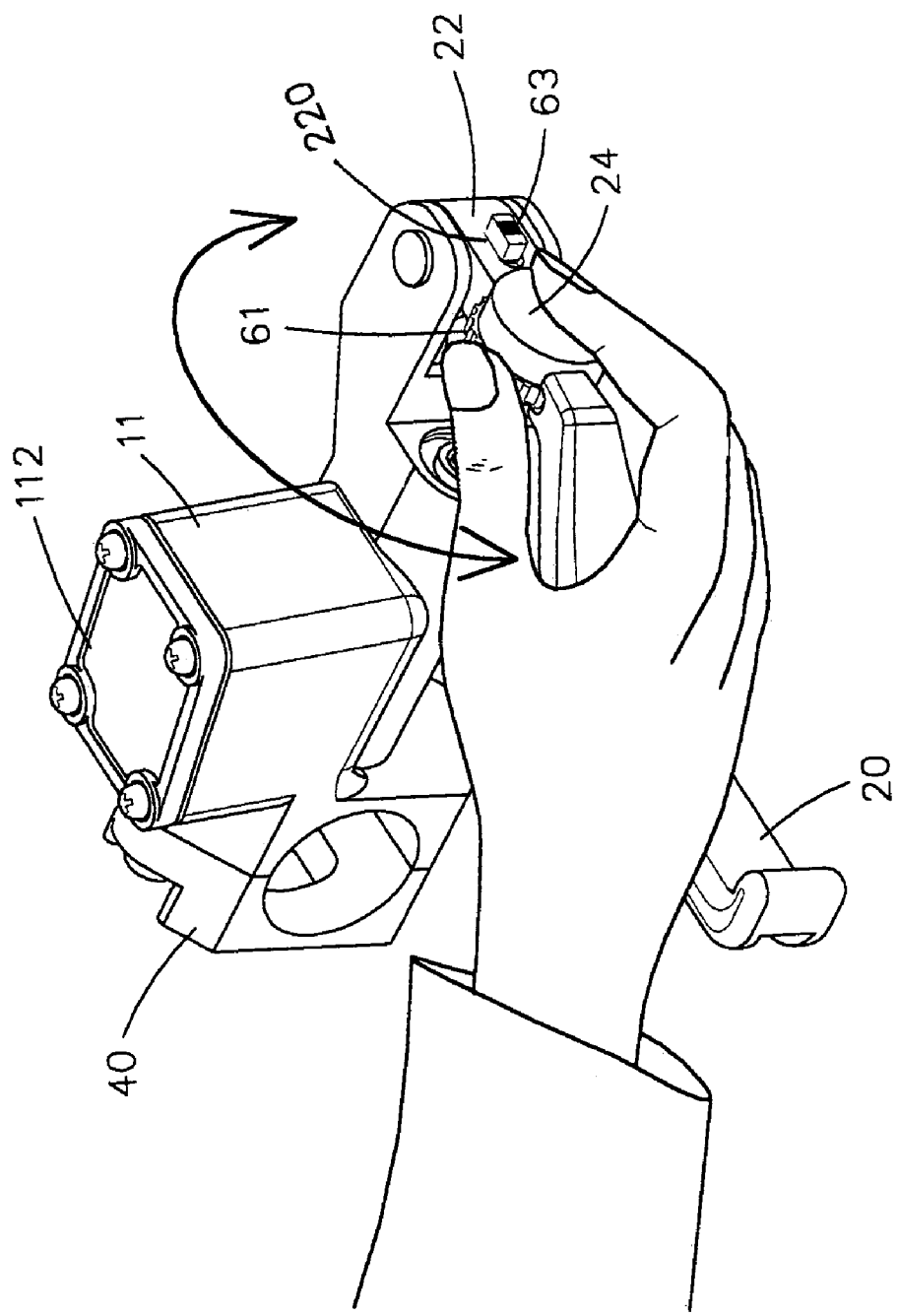
FIG. 4 is a schematic operational view of the hydraulic brake lever for a bicycle as shown in FIG. 2 in adjustment.

In practice, referring to FIGS. 1–6, when the user wishes to adjust the sensitivity of the brake, the adjusting wheel 61 can be rotated as shown in FIG. 4. At this time, the threaded rod 62 is retained by the adjusting rod 64, so that the threaded rod 62 will not be rotated by rotation of the adjusting wheel 61. Thus, rotation of the adjusting wheel 61 will force the threaded rod 62 to move linearly to press the adjusting rod 64 which presses the press rod 121 of the main body 11 into the cylinder 12, so that the operation stroke of the brake can be changed and adjusted, so as to adjust the sensitivity of the brake to the optimum state.

Figure 5:
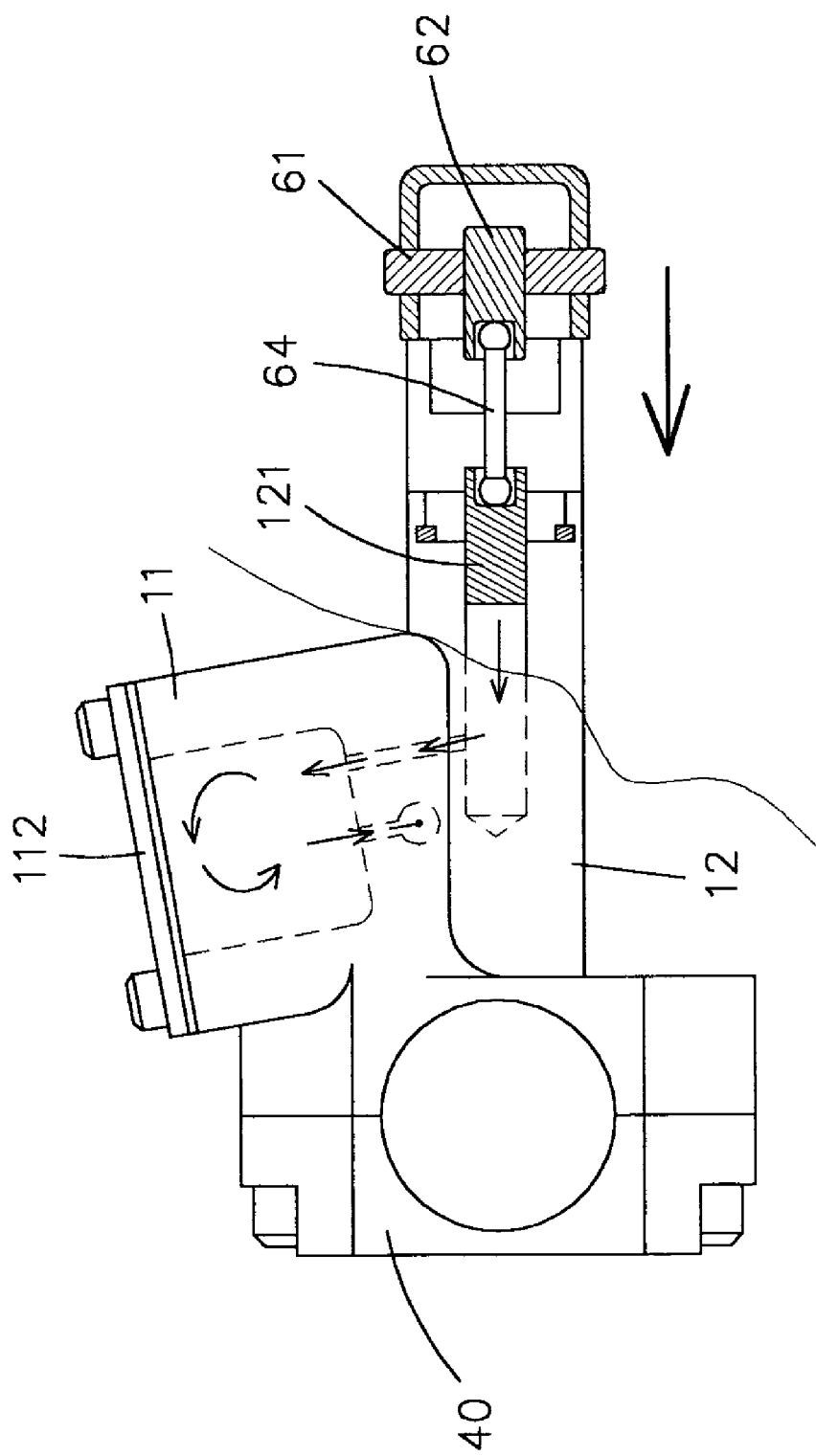
FIG. 5 is a schematic operational view of the hydraulic brake lever for a bicycle as shown in FIG. 3 in use.

In operation, the pull handle 20 can be pressed toward the main body 11, to press the adjusting rod 64 which presses the press rod 121 of the main body 11 into the cylinder 12, so that the hydraulic oil contained in the hydraulic oil tank 110 of the main body 11 can flow into the brake as shown in FIG. 5, so as to operate the brake, thereby achieving a braking effect.

Accordingly, the hydraulic brake lever can be operated conveniently and smoothly, thereby facilitating the rider operating the hydraulic brake lever. In addition, the hydraulic brake lever is sensitive, thereby protecting the rider's safety. Further, the operation stroke of the brake can be changed and adjusted conveniently, so as to adjust the sensitivity of the brake to the optimum state.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A hydraulic brake lever for a bicycle, comprising a main body, a pull handle, and an adjusting mechanism, wherein:

the main body has an inside formed with a hydraulic oil tank, the main body has a bottom provided with a cylinder connected to the hydraulic oil tank, the main body includes a press rod slidably mounted in the cylinder;

the pull handle has a front end pivotally mounted on the main body and an oblong slide slot is defined in the front end; and the adjusting mechanism is mounted on the front end of the pull handle and includes an adjusting wheel rotatably mounted on the pull handle, a threaded rod screwed in the adjusting wheel, and an adjusting rod secured between a distal end of the threaded rod and a distal end of the press rod of the main body, the adjusting mechanism further includes a locking block slidably mounted in the slide slot of the pull handle to lock the adjusting wheel after adjustment.

2. The hydraulic brake lever for a bicycle in accordance with claim 1, wherein the main body has an irregular shape.

3. The hydraulic brake lever for a bicycle in accordance with claim 1, further comprising a cover mounted on a top of the main body to encompass the hydraulic oil tank of the main body.

4. The hydraulic brake lever for a bicycle in accordance with claim 3, further comprising a leakproof washer mounted between the cover and the top of the main body.

5. The hydraulic brake lever for a bicycle in accordance with claim 1, wherein the main body has a side provided with a semi-circular clamping block, and the hydraulic brake lever further comprises a semi-circular clamping body combined with the clamping block of the main body, thereby defining a circular receiving hole between the clamping body and the clamping block of the main body.

6. The hydraulic brake lever for a bicycle in accordance with claim 1, wherein the cylinder is provided with a protruding pivot base, and the front end of the pull handle is pivotally mounted on the pivot base of the main body by a pivot shaft.

7. The hydraulic brake lever for a bicycle in accordance with claim 1, wherein the front end of the pull handle is provided with a cylindrical receiving seat having an inside formed with a receiving chamber and having a peripheral wall formed with a receiving groove communicating with the receiving chamber, the adjusting wheel is rotatably mounted in the receiving groove of the receiving seat of the pull handle, and the threaded rod is movably mounted in the receiving chamber of the receiving seat of the pull handle.

8. The hydraulic brake lever for a bicycle in accordance with claim 1, wherein the adjusting wheel is formed with a screw bore screwed on the threaded rod.

9. The hydraulic brake lever for a bicycle in accordance with claim 1, wherein the distal end of the threaded rod is formed with a positioning hole for securing a first end of the adjusting rod, and the distal end of the press rod of the main body is formed with a positioning hole for securing a second end of the adjusting rod.

\* \* \* \* \*